Oct. 15, 1968    S. BUNISH ET AL    3,406,248
CABLE WITH EXTRUDED COVERING HAVING FIBROUS INTERLAYER
Filed Oct. 27, 1966

INVENTORS
STEVE BUNISH
ROSARIO J. PERRONE
BY
V. F. Volk

THEIR AGENT

United States Patent Office 3,406,248
Patented Oct. 15, 1968

3,406,248
CABLE WITH EXTRUDED COVERING HAVING FIBROUS INTERLAYER
Steve Bunish and Rosario J. Perrone, Marion, Ind., assignors to Anaconda Wire and Cable Company, a corporation of Delaware
Filed Oct. 27, 1966, Ser. No. 589,879
2 Claims. (Cl. 174—121)

ABSTRACT OF THE DISCLOSURE

An electrical cable has plural insulation layers with a multi-layered fibrous material between the layers. The fibrous material is introduced between the layers during an extrusion operation.

---

Our invention relates to cable coverings and particularly to extruded rubber-like coverings that are reinforced against stretching and tearing by a fibrous interlayer.

It has been known in the manufacture of electric cables to extrude a layer of rubber or similar insulation over a conductor and to protect the insulation with an extruded neoprene jacket or a jacket of some other rubber-like material with good abrasion resistance and resistance to oxidation by the atmosphere. To prevent tears that develop in the jacket from continuing down into the insulation and to add tensile strength to the combined covering it has been known to apply a textile serving or braid over the insulation prior to the extrusion of the jacket. Extrusion is carried out continuously at high speed while braiding and serving are performed relatively slowly due to the requirement for replacing bobbins as they run out, and to the nature of the serving and braiding processes. In considering this problem it is important to realize that the two layers to be reinforced cannot be entirely separated by a textile layer but must, rather, have large areas of continuity through the textile layer so that the latter serves as a reinforcement and not as a separator.

We have found that extruded tubular members such as cable jacketings, can be reinforced with fibers in a continuous operation without reducing the speed from that of normal extrusion by applying cut fibers in an irregular pattern to the surface of an extruded rubber-like layer and immediately extruding another rubber-like layer over it.

In particular, we have invented an electric cable comprising a core, a rubber-like protective layer surrounding the core, a fibrous layer surrounding the rubber-like layer comprised of individual, short, irregularly disposed lengths of tensile fiber such, for a preferred example, as chopped cotton twine. There is a second rubber-like protective layer surrounding the fibrous layer with the fibers being bonded to both layers and the second layer bonded to the first layer at interstices between the fibers.

We have invented an apparatus for forming a tubular covering comprising, in tandem, a first extrusion head extruding a first tubular rubber-like layer and comprising a mandrel, an extrusion die coaxial with the mandrel and means supplying rubber-like stock to a confined zone between the die and the mandrel under high pressure so as to extrude the stock. There are means in our apparatus applying adhesive over the extruded layer when, as shall be explained, adhesive is necessary, and means supplying cut fibers to the surface. This comprises means for suspending the fibers in a gaseous current and passing the current around the adhesive-covered layer. A second extrusion head applies another rubber-like layer over the first layer and the fibers. This head comprises a mandrel closely fitting over the first layer and the fibers, and an extrusion die coaxial with the second mandrel. There are means for supplying rubber-like stock to a confined zone between the die and the second mandrel under high pressure so as to extrude the stock over the first layer and the fibers and preferably there are heating and pressurizing means mounted downstream of the dies for curing the layers.

We have invented the method of forming a reinforced tubular extrusion comprising the steps of continuously and sequentially extruding a first tubular rubber-like member and coating it, if necessary, with adhesives, then passing a gaseous stream comprising a suspension of cut fibers around the member so that the fibers adhere to the surface in irregular patterns. Finally we extrude a second tubular rubber-like member over the first member and the fibers so that the fibers adhere to both members.

A more thorough understanding of our invention may be gained from the appended drawing.

Figure 1:
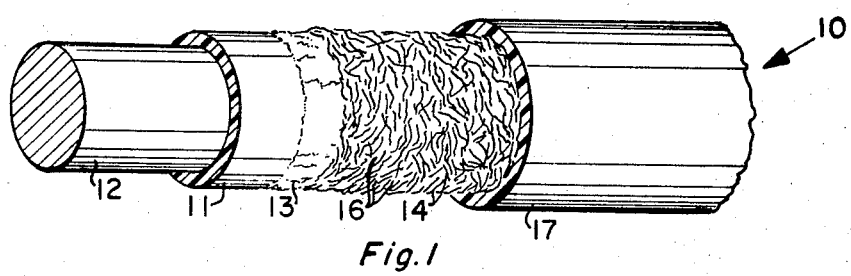
FIGURE 1 shows a lengthwise cut-away view of a cable made in accordance with our invention.

A cable, indicated generally by the numeral 10 has an extruded layer of synthetic rubber or rubber-like material 11 over a core 12 which may be a metal conductor or a plurality of insulated strands or combination thereof. Many different kinds of cable cores are known and our invention is directed to jacket means for protecting the core rather than the core itself although we wish it to be recognized that it is within the scope of our invention for our cables to form an element of a core that may itself be an element of a larger cable embodying our invention. The extrusion 11 may be natural or synthetic rubber or cured or uncured polyolefin, chlorosulfonated polyethylene, vinyl, or other rubber-like compound over which there has been applied an adhesive 13. In the finished cable the adhesive 13 may have completely disappeared by blending into the surrounding material. The nature of the adhesive 13 will depend principally on the nature of the extruded material, but also, to a lesser degree, on the substance of fibers 14 which are bonded to it. Where, for example, the extrusions are butyl rubber the adhesive 11 may be a mineral oil and, in general, it will be a liquid that has some solvent action on the extrudate. The fibers 14 are cut fibers preferably between ¼ and 1 inch in length, depending on the diameter of the cable. For neoprene extrusion a chopped seine twine is eminently satisfactory as reinforcing. The fibers 14 are not laid parallel or in any uniform pattern but are distributed irregularly with some fibers extending substantially lengthwise of the cable and some around a circumference. The fibers 14 are not built up into a thick layer or felt since it is a feature of our invention that each fiber is individually bonded to the surface of the layer 11. Some of the fibers 14 cross each other and thus, at a single point, form a layer 2 fibers thick, but the layer thickness formed by the fibers in general is not greater than 1 fiber thickness and interstices 16 remain between the fibers where the surface of the layer 11 covered by adhesive 13 is exposed to an overlaying extruded layer 17. The layer 17 may be of the same material as the layer 11, or it may be a different material as when the material 11 is a good insulating compound like butyl rubber and the layer 17 is a good jacket compound like neoprene. In electric cables, and this is true also for other elongated articles, such as hoses, it is desirable for two concentric layers to be bonded together. This makes them cooperate in supporting any tensile load and prevents the outer layer from bunching up when the cable or hose is clamped or abraded. When the two layers are monolithic any cracks or tears in the outer layer will tend to be extended into the underlying layer. In our cable structure, however, local tensile stresses that are carried down through the layer 17 due, for example, to a tear, are transferred to the fibers 14 so that a similar tear is not initiated in the layer 11. The fibers 14 also relieve the longitudinal tensile stresses that occur when the cable is flexed.

It is important that the layer 17 should bond not only to the fibers 14 but to the underlying layer 11. This bonding occurs at the interstices 16 between the fibers. The fibers 14 all lie flat against the surface of the layer 11 in an irregular pattern and do not extend out of the circumferential plane except for the occasional double thickness where two fibers cross each other. Thus the reinforcing effect of the fibers 14 is achieved without sacrificing the electrical and moisture protection afforded by a heavy wall thickness of the layers 17 and 11, free from foreign fibers that might wick and would inevitably reduce the dielectric strength if they penetrated into the layer walls.

Figure 2:
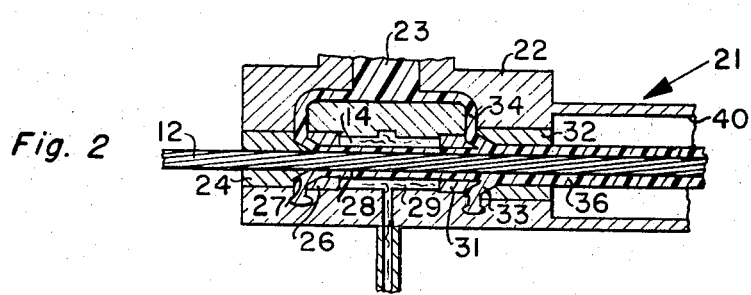
FIGURE 2 shows a side view in section of the apparatus of our invention.

In FIGURE 2 our apparatus, indicated generally by the numeral 21, comprises an extruded head 22 into which is fed a rubber-like stock 23 by means of a screw or other device in a known manner. The cable core 12 passes through a hollow mandrel 24 and into a die 26. The mandrel 24 and die 26 comprise walls of a confined zone 27 within which the stock 23 is applied around the core 12 under high pressure to form an extruded tubular member 28 over the core 12. The member 28 is covered with fibers 14 in a chamber 29 from which it immediately enters another hollow mandrel 31 and another die 32. The mandrel 31 and die 32 comprise the walls of a confined zone 33 into which the stock 23 is fed at high pressure through a channel 34. When the stock 23 is neoprene and the fibers 14 are chopped cotton seine twine we have found that no adhesive is necessary in order for the fibers to adhere to the surface of the layer forming the member 28 so long as the fibers are applied to the freshly extruded surface and immediately covered by another tubular member 36. When, as in the present case, the same stock is being extruded in both layers and the second layer is applied while the first layer is still hot the layers or members 28, 36 bond to each other as well as to the fibers 14. On leaving the extruder head 22 the cable enters a vulcanizing tube 40 where it is cured by the application of heat and steam pressure. From the tube 40 the cable is taken up by a capstan and reeling apparatus, not shown, of which several types are well known.

Figure 3:
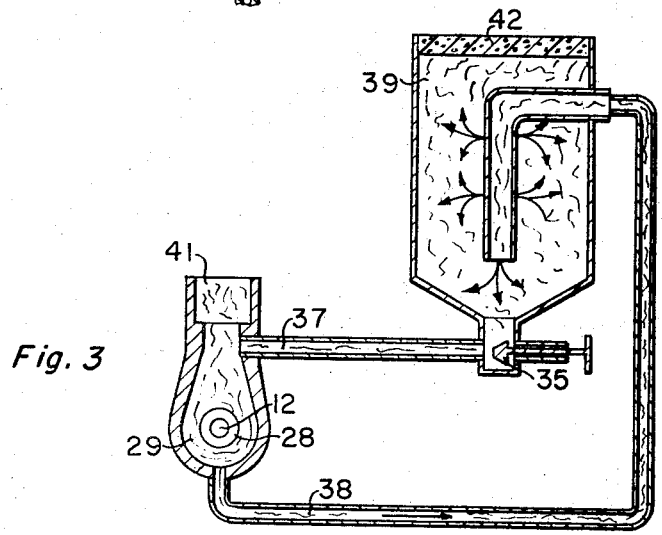
FIGURE 3 shows a front section of an element of FIGURE 2.

The means of applying the fibers 14 over the member 28 is best understood by reference to FIGURE 3. Here it is seen that the chamber 29 is connected by an inlet tube 37 and outlet tube 38 to a flocculating chamber 39 where the quantity of fibers entering the chamber 29 are controlled by means of a valve 35. Air entering a port 41 draws the flock laden air from the inlet 37 by venturi effect around the member 28, excess air returning through the tube 38 to the chamber 39 where the pressure is relieved through a porous plate 42.

Figure 4:
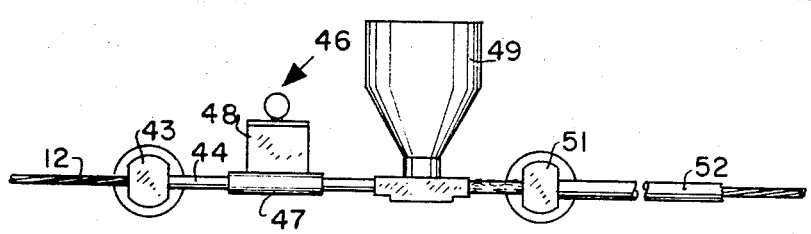
FIGURE 4 shows a side view of another embodiment of our apparatus.

The apparatus of FIGURE 2 is preferred for neoprene and other extrudates that are more or less tacky on the freshly extruded surface, and in cases where both layers are extruded with the same stock. In FIGURE 4 we have shown an apparatus and method where an adhesive is applied over the first extrusion. Here the core 12 passes through an extrusion head 43 where it is covered with a first rubber-like layer 44 whence it enters an adhesive applicator 46 comprising a tube 47 supplied with adhesive from a tank 48. The adhesive lubricated core then passes into a fiber applicator 49 operating in the same manner as the applicator of FIGURE 3 and into a second extrusion head 51 wherein a rubber-like layer 52 is applied which may be a different material from the layer 44.

We have invented a new and useful article, apparatus and method of which the foregoing description has been exemplary rather than definitive and for which we desire Letters Patent as defined in the appended claims.

We claim:
1. An electric cable comprising:
 (A) a core,
 (B) a first rubber-like protective layer surrounding said core,
 (C) a fibrous layer surrounding said first layer,
  (a) said fibrous layer being comprised of individual, short lengths of fibers,
  (b) said lengths being irregularly disposed on the surface of said first layer with interstices between said fibers,
 (D) a second rubber-like protective layer surrounding said fibrous layer,
  (a) said fibers being bonded to said first and to said second layers, and
  (b) said second layer being bonded to said first layer at interstices between said fibers.
2. The electric cable of claim 1 wherein said fibrous layer is comprised of chopped cotton twine.

References Cited
UNITED STATES PATENTS
2,718,544   9/1955   Shepp _____ 174—120

LEWIS H. MYERS, *Primary Examiner.*
E. GOLDBERG, *Assistant Examiner.*